US007653743B2

(12) United States Patent
Kamentsky et al.

(10) Patent No.: US 7,653,743 B2
(45) Date of Patent: Jan. 26, 2010

(54) PROTOCOL FOR THROTTLING HIGH VOLUME MESSAGES

(75) Inventors: Lee Kamentsky, Arlington, MA (US); Peter Hall, Ashtead Surrey (GB); Chaitanya Kanojia, Newton, MA (US)

(73) Assignee: Microsoft Corporation, Redmond, WA (US)

( * ) Notice: Subject to any disclaimer, the term of this patent is extended or adjusted under 35 U.S.C. 154(b) by 32 days.

(21) Appl. No.: 09/999,718

(22) Filed: Oct. 31, 2001

(65) Prior Publication Data

US 2002/0103930 A1    Aug. 1, 2002

Related U.S. Application Data

(60) Provisional application No. 60/253,462, filed on Nov. 28, 2000.

(51) Int. Cl.
*G06F 15/173* (2006.01)
*G06F 3/00* (2006.01)
*H04L 12/28* (2006.01)
*G06F 11/30* (2006.01)

(52) U.S. Cl. .................. 709/244; 709/224; 709/226; 725/39; 370/392; 713/201

(58) Field of Classification Search .................. 709/244, 709/203, 225, 224, 226, 227, 229; 725/39; 370/392; 713/201
See application file for complete search history.

(56) References Cited

U.S. PATENT DOCUMENTS 4,864,559 A    9/1989    Perlman (Continued)

FOREIGN PATENT DOCUMENTS

EP    1 071 287 A2    1/2001
WO    WO 99/52285    10/1999

OTHER PUBLICATIONS

Anerousis, N.; Hjalmtysson, G.; "Service level routing on the Internet" Global Telecommunications Conference, 1999. Globecom '99, vol. 1B, 1999 pp. 553-559 vol. 1b.*

(Continued)

*Primary Examiner*—Philip C Lee
(74) *Attorney, Agent, or Firm*—Shook Hardy & Bacon LLP

(57) ABSTRACT

A scalable messaging system for data transmission between the network devices, such as set top boxes, and a central system server, such as a server which maintains a database of event logs for the network. Individual routers at the data center broadcast an announcement packet indicating that they are available to accept messages from the network devices. The announcement message contains at least an identification of the router and the manner in which messages may be sent to it, e.g., one or more connection socket numbers and/or network addresses. The frequency at which availability messages are sent by the routers is preferably dependent upon the relatively loading of the individual router. Thus, the more heavily loaded a particular router becomes, the less often it will broadcast an availability message; the more lightly loaded it becomes, the more often such messages are broadcast. The network devices then transmit messages to the data center only in response to having received such a router availability announcement. The information in a router availability message can be used in various ways to construct a payload message back to the data center, such as by using ports numbers, persistent identification numbers, or Media Access Control (MAC) layer addresses, depending upon the topology of the data network. This protocol thus permits control over the generation of messages, such as connection request messages, which might otherwise flood a network with large numbers of end node devices.

10 Claims, 10 Drawing Sheets

U.S. PATENT DOCUMENTS

| | | | |
|---|---|---|---|
| 5,309,433 A | 5/1994 | Cidon et al. ............... 370/60 |
| 5,532,732 A | 7/1996 | Yuen et al. ............... 348/1 |
| 5,572,528 A * | 11/1996 | Shuen ............... 370/402 |
| 5,659,686 A | 8/1997 | Hou |
| 5,805,804 A | 9/1998 | Laursen et al. |
| 5,819,036 A | 10/1998 | Adams et al. ............ 395/200.33 |
| 5,951,639 A | 9/1999 | MacInnis ............... 709/217 |
| 5,982,413 A | 11/1999 | Irie et al. |
| 5,991,292 A | 11/1999 | Focsaneanu et al. |
| 6,018,766 A | 1/2000 | Samuel et al. ............ 709/218 |
| 6,020,883 A | 2/2000 | Herz et al. |
| 6,047,324 A * | 4/2000 | Ford et al. ............... 709/227 |
| 6,055,560 A | 4/2000 | Mills et al. |
| 6,065,061 A | 5/2000 | Blahut et al. ............ 709/239 |
| 6,084,876 A | 7/2000 | Kwok et al. |
| 6,092,178 A | 7/2000 | Jindal et al. |
| 6,111,882 A | 8/2000 | Yamamoto |
| 6,195,680 B1 | 2/2001 | Goldszmidt et al. |
| 6,195,706 B1 * | 2/2001 | Scott ............... 709/245 |
| 6,226,684 B1 * | 5/2001 | Sung et al. ............... 709/238 |
| 6,275,492 B1 * | 8/2001 | Zhang ............... 370/392 |
| 6,307,843 B1 * | 10/2001 | Okanoue ............... 370/312 |
| 6,397,260 B1 * | 5/2002 | Wils et al. ............... 709/238 |
| 6,400,722 B1 * | 6/2002 | Chuah et al. ............... 370/401 |
| 6,496,859 B2 * | 12/2002 | Roy et al. ............... 709/223 |
| 6,549,522 B1 * | 4/2003 | Flynn ............... 370/313 |
| 6,701,375 B1 * | 3/2004 | Walker et al. ............ 709/243 |
| 6,711,171 B1 * | 3/2004 | Dobbins et al. ............ 370/400 |
| 6,771,644 B1 * | 8/2004 | Brassil et al. ............ 370/390 |
| 6,779,039 B1 * | 8/2004 | Bommareddy et al. ...... 709/238 |
| 6,789,118 B1 * | 9/2004 | Rao ............... 709/225 |
| 6,804,720 B1 * | 10/2004 | Vilander et al. ............ 709/229 |
| 7,047,273 B2 | 5/2006 | Kamentsky |
| 2001/0039623 A1 * | 11/2001 | Ishikawa ............... 713/201 |
| 2003/0016672 A1 * | 1/2003 | Rosen et al. ............... 370/392 |

OTHER PUBLICATIONS

Guerney D.H. Hunta et al.; "Network Dispatcher: a connection router for scalable Internet services" IBM T.J. Watson Research Center, Yorktown Heights, NY, U.S.A. 1998. Retrieved from http://decweb.ethz.ch/WWW7/1899/com1899.htm on Dec. 20, 2004.*

Stevens, W. Richard "TCP/IP Illustrated, vol. 1: The Protocols", *Addison-Wesley*, ch. 1.9, pp. 12-13 (1994).

Web-archive of the IANA definitions of port numbers from May 19, 2001 http://web.archive.org/web/20010519080902/http://www.iana.org/assignments/port-numbers.

* cited by examiner

| Device GUID | | |
|---|---|---|
| FIELD | SIZE | DESCRIPTION |
| Data 1 | 32 biits | Reserved |
| Data 2 | 16 biits | Network ID |
| Data 3 | 16 biits | Router ID |
| Data 4 | 64 biits | Device ID |

FIG. 4

| ROUTER ANNOUNCER SERVICE UDP PACKET | | | |
|---|---|---|---|
| FIELD | SIZE | COMMENTS | |
| gIdentifier | 128 bits | This is set to HG_ROUTER_ ANNOUNCEMENT_PACKET to indicate that the packet is an announcement of router addresses | } 500 |
| tCurrent | 64 bits | The time of the announcement | } 510 |
| nPort1 | 2 bytes | Port # of preferred router | } 520 |

FIG. 8

| Device connection UDP packet: Initial provisioning case |||
|---|---|---|
| FIELD | SIZE | COMMENTS |
| gObject | 128 bits | IID_HG_ConnectionRequest= 6F736237-F105-4474-AF4C-3CAF4893B7B1 |
| nUnused | 64 bits | Unused field-set this to zero |
| nPort | 2 bytes | Port number to use to connect to device. |

FIG. 9A

| Device connection UDP packet: DEVICE ID case |||
|---|---|---|
| FIELD | SIZE | COMMENTS |
| gObject | 128 bits | IID_HG_DIConnectionRequest= EDEBF4D9-4022-478B-B18B-ACFCE2644960 |
| nDeviceID | 64 bits | Persistant device ID. |
| nPort | 16 bits | Port number to use to connect to device. |

FIG. 9B

| Device connection UDP packet: MAC address case |||
|---|---|---|
| FIELD | SIZE | COMMENTS |
| gObject | 128 bits | IID_HG_MACConnectionRequest= 98D631DA-2756-49E5-AD2F-B4766ACD09A4 |
| nMACAddress | 64 bits | Device's MAC address |
| nPort | 16 bits | Port number to use to connect to device. |

FIG. 9C

PROTOCOL FOR THROTTLING HIGH VOLUME MESSAGES

RELATED APPLICATION(S)

This application claims the benefit of U.S. Provisional Application No. 60/253,462, filed on Nov. 28, 2000, the entire teachings of which are incorporated herein by reference.

BACKGROUND OF THE INVENTION

At the present time, most data network devices located in residences include some type of personal computer. Typically, these personal computers are used to connect to Internet Service Providers over dial-up connections to execute application programs such as email clients and Web browsers that utilize the global Internet to access text and graphic content. Increasingly, the demand is for multimedia content, including audio and video, to be delivered over such networks. However, the backbone architectures of purely data networks, especially those designed for use with the telephone network, were not originally designed to handle such high data rates.

The trend is towards a more ubiquitous model where the network devices in the home will be embedded systems designed for a particular function or purpose. This has already occurred to some degree. Today, for example, cable television (CATV) network set-top boxes typically have limited data communication capabilities. The main function of the data devices is to handle channel access between residential users and a head end or server on the cable TV network.

However, it is estimated that the worldwide market for Internet appliances such as digital set-top boxes and Web-connected terminals will reach $17.8 billion in 2004, and millions of such digital set-top boxes have already been deployed. Increasingly, advertisers and content providers view the cable set-top as the first platform of choice for widespread delivery of a suite of intelligent content management and distribution services.

In the future, the functionality offered by these set-top boxes or other embedded platforms, such as a game system, will be expanded. For example, they may offer Internet browsing capabilities and e-commerce serving capabilities. Moreover, it is anticipated that common-household appliances will also have network functionality, in which they will be attached to the network to automate various tasks.

SUMMARY OF THE INVENTION

Because of their extremely large number of network devices in such networks, efficient distribution and delivery of management services, promotions and digital content remains a challenge. The data networks must evolve with deployment of these embedded systems. Where the personal computer can be updated with new network drivers as the network evolves, embedded client systems remain relatively static. Such networks may have hundreds of thousands, if not millions, of network devices to manage. It is evident that standard data Open Systems Inerconnection (OSI) layered network protocols, which were optimized for peer to peer communication, are not an entirely acceptable arrangement.

Consider that the digital set top box provides certain interesting functionalities, such as the ability to collect data, such as a log of the channels watched over time, and other events. The set top box can be designed and program to them report this information to a central location. At the central location, this data can be aggregated for many hundreds of thousands of users. This information, when coupled with other information such as demographics, can then be used by advertisers and service providers to blanket defined market segments with promotions, advertisements, and content. The digital delivery of promotions can then allow for impulse responses yielding immediate increases in revenues.

However, such a network may have hundreds of thousands, if not millions of set top boxes, attempting to deliver event log information. If such a data network were built using standard data protocols such as TCP/IP, the sheer number of connection request messages alone could cause the performance of a central data server to degrade to the point where it is unable to carry out reliable message delivery.

The present invention implements a scalable messaging system for data transmission between the network devices, such as set top boxes, and a central system server, such as a server which maintains a database of event logs for the network.

Specifically, the individual routers at the data center broadcast an announcement packet indicating that they are available to accept messages from the network devices. The announcement message contains at least an identification of the router and the manner in which messages may be sent to it, e.g., one or more connection socket numbers and/or network addresses.

The frequency at which these availability messages are sent by the routers is preferably dependent upon the relative loading of the individual router. Thus, the more heavily loaded a particular router becomes, the less often it will broadcast an availability message; the more lightly loaded it becomes, the more often such messages are broadcast.

The network devices then transmit messages to the data center only in response to having received such a router availability announcement. The information in a router availability message can be used in various ways to construct a payload message back to the data center, such as by using ports numbers, persistent identification numbers, or Media Access Control (MAC) layer addresses.

This protocol thus permits control over the generation of messages, such as connection request messages, which originate at the network devices. It avoids a situation whereby such messages might otherwise tend to flood a network that consists of an extremely large number of end nodes that need to communicate to a central location.

The implementation of a device management protocol in this manner assists network operators to cost effectively support the advanced features of the set-top box, such as to provide targeted promotion and digital content distribution services. This enables network operators to generate new revenues and provide a richer interactive environment for consumers.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 illustrates a Global Unique Identifier assigned to the network devices so that they may be addressed by an application.

FIG. 8 is an exemplary router announcement service message.

FIGS. 9A, 9B, and 9C are different types of device connection messages returned in response to the router announcement service message.

DETAILED DESCRIPTION OF THE INVENTION

1. A Targeted Promotion Delivery System

Figure 1:
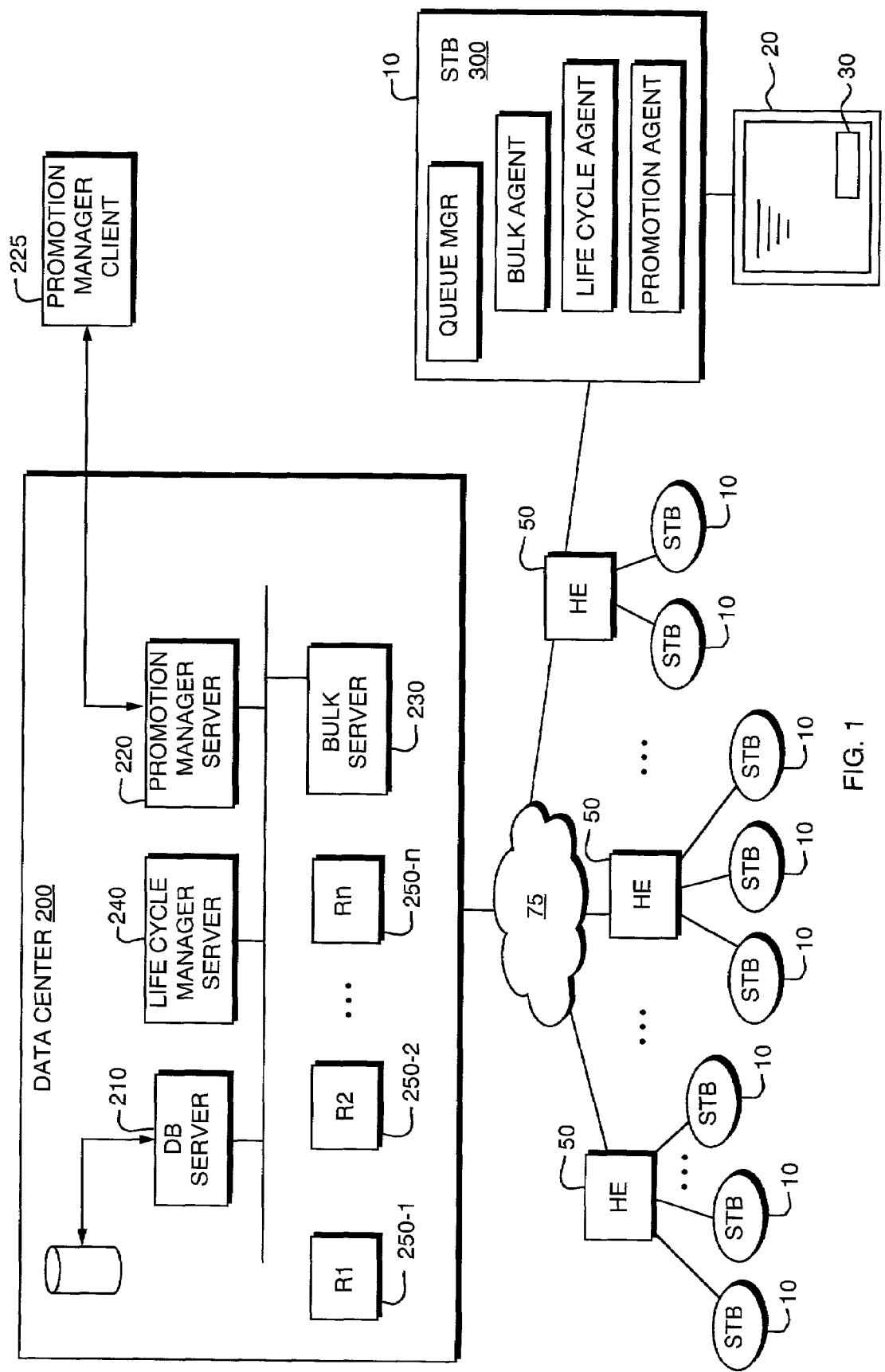
FIG. 1 is a block diagram of a network in which a messaging protocol according to the invention may be used to control the transmission of messages from an extremely large number of transmitting network devices to a central receiver location.

Turning attention now to the drawings, FIG. 1 illustrates a multimedia content delivery system which uses a message throttling protocol according to one embodiment of the present invention. The system includes a large number of set top boxes or network devices 10 connected to respective video displays 20, such as televisions. Promotions 30 typically include promotional content that may be presented in various multimedia formats including standard audio visual clips, but also computer graphics, icons, or Hypertext Markup Language (HTML) content. Promotions are used to advertise goods and services, promote events, or present other commercial or non-commercial information. One or more promotions 30 may be simultaneously active within the video displays 20 and may be displayed in different ways. For example, promotions 30 can be presented on electronic program guides, channel information bars, or by overlaying video broadcast programming. Some active promotions that may be displayed on digital set top boxes allow user interaction such as linking to e-commerce web-sites via hyperlink connections or direct communication with the server subsystem of the promotion delivery system to obtain additional software, such as device drivers, video games, or other application software.

As shown in FIG. 1, the network devices also include a promotion server subsystem 200 located at a data center, and a promotion agent subsystem 300 embedded within each of the network devices. The promotion server subsystem 200 and the promotion agent subsystems 300 communicate with each other through a combination of application-level messaging and serialized bulk data transmissions.

The promotion server subsystem 200 periodically collects viewer usage data from the promotion agent subsystem 300 of each of the multimedia content viewing devices to generate viewership profiles. In television networks, the data collected by the promotion server subsystem 200 may include tuner data (i.e., a history of channels watched) and responses to past promotions. This history is kept on a relatively fine time scale, such as five seconds. In this way, it can be determined how long a particular promotion was deployed, or even which portions of a promotion or video program were viewed.

In more detail regarding promotion delivery, the promotion server subsystem 200 includes a database server 210, a promotion manager server 220, a bulk data server 230, a promotion manager client 240, a life-cycle manager server 240, and a bank of routers 250-1, 250-2, ..., 250-n. These components are typically located at a central location in the multimedia network at a data center, at a head end, or divided between the two depending on the density and population of devices. It should be understood that these components may share physical platforms or de distributed across multiple machines located at different places in the network. For scalability reasons, a promotion packaging process in the promotion manager server 220 may be separated from a function which is responsible for delivering promotion packages to the network devices 10. The delivery function may be instantiated on multiple machines, for example, to provide better scalability, such as having one machine per head end in the network. The life cycle manager 240 may also be instantiated separately for each router 250.

The routers 250 communicate with the network devices 10 through a data network 75 which may itself include a further hierarchy of routers and bulk servers (not shown in FIG. 1). Ultimately, each of the network devices is connected to the network 75 through a head end location 50. In a typical cable television network, there may be many thousands of network devices connected to a particular head end, and there may be many thousands of head ends 50.

To determine how to deliver targeted promotions to the network devices, the life-cycle manager server 240 of the promotion server subsystem 200 first generates viewership profiles for each of the multimedia content viewing devices from the collected data using a variety of statistical models. The viewership profiles are then used to associate groups of network devices with a given target promotion.

Promotion groups are collections of multimedia content viewing devices whose individual viewership profiles match membership criterion describing a particular demographic or viewership history. For example, a promotion group may be demographically based, i.e., "married women in their 30's with more than one school age child and a household income of at least $100,0000," or based on viewership history, i.e., "tends to watch the Golf Channel on Sunday afternoon." Therefore, the promotion delivery system is adaptable to changes in viewer usage or viewership patterns by making adjustments to promotion groups. Promotion groups are described in more detail in U.S. Provisional Patent Application Ser. No. 60/253,488 filed Nov. 28, 2000, entitled "Using Viewership Profiles for Targeted Promotion Deployment" which is hereby incorporated by reference in its entirety.

Promotions are then scheduled for delivery to specific promotion groups. A promotion is scheduled for delivery to a promotion group by an advertiser or service provider entering a scheduling request for a promotion such as via a promotion manager interface client 225. The promotion manager server 220 packages the promotion for delivery and stores it in the database 210. Later, the package information is read from the database 210 and used to create customized transmission schedules that specify when and how each of the network devices 10 is to receive it. A preferred technique for packaging promotions into messages to be sent to the network devices is described in U.S. Provisional Patent Application Ser. No. 60/253,489 filed Nov. 28, 2000, entitled "Promotion Packaging for Transmission Groups" which is hereby incorporated by reference in its entirety.

The promotion agent subsystem 300 embedded in each of the network devices 10 includes a promotion agent 310 and a bulk data agent 320. Upon receipt of the transmission schedule messages, the promotion agent 310 processes each schedule entry and waits for the bulk data agent 320 to deliver each promotion identified in the transmission schedule. The bulk data agent 320 then handles the reception of the promotions from the scheduled data transmission as specified in the promotion download requests. For example, in one embodiment, the bulk data agent 320 tunes into a multicast data transmission stream at a specified time and channel or network address specified in the transmission schedule.

The promotion manager server 220 extracts the promotion package from the database 210 and converts it into a transmission request that is sent to the bulk data server 230. The bulk data server 230 fetches the promotions from the database 210 that are identified in the transmission request message, and transmits them via multicast or broadcast transmission depending on transmission control data specified in the transmission request.

Once the promotions have been successfully delivered, the promotions are activated at the network viewing devices as specified in promotion control data of the transmission schedules. Promotion activation may be event, time, or channel driven.

Figure 2:
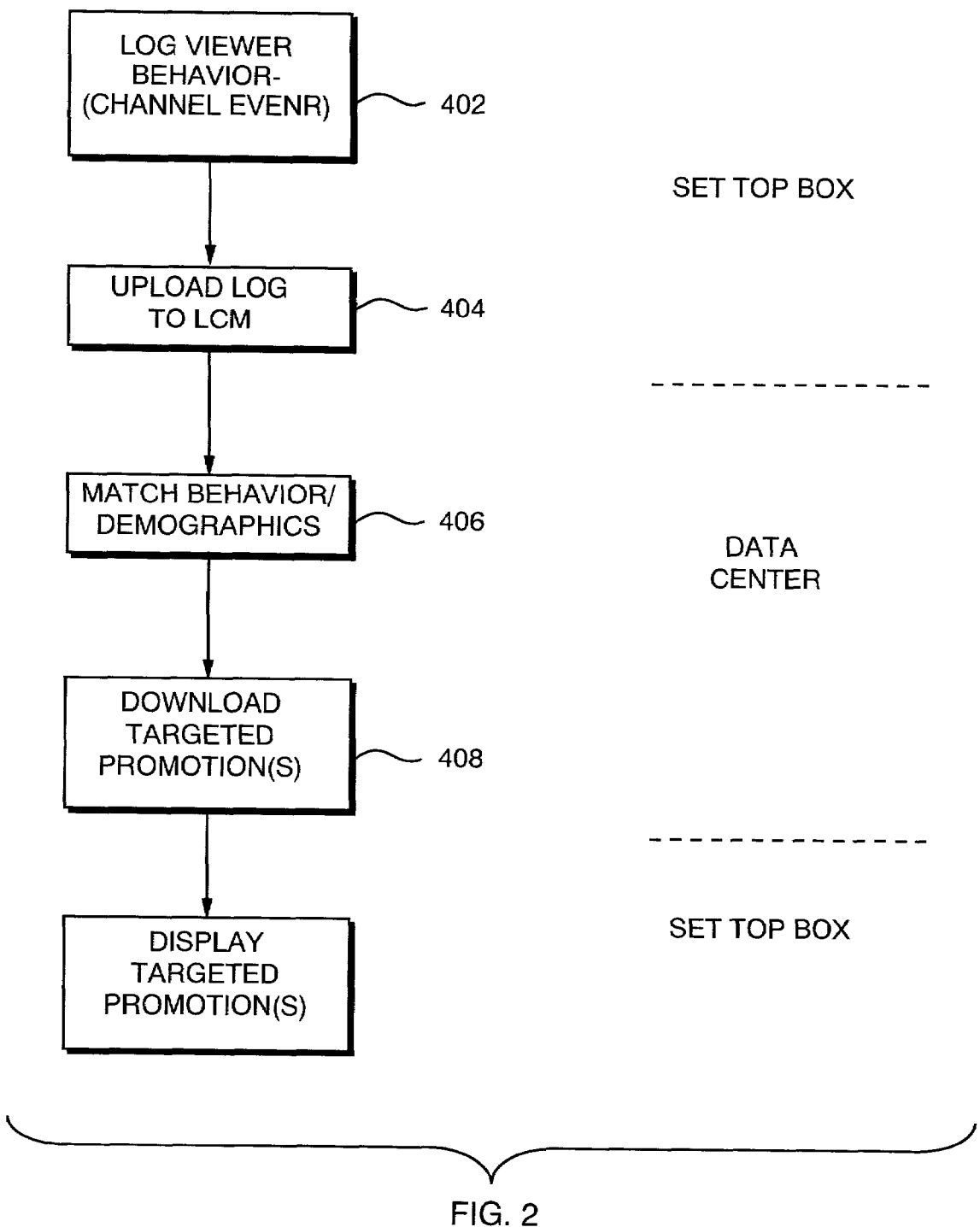
FIG. 2 is a high level process flow diagram of a particular application which makes use of the protocol to deliver targeted promotions and content.

FIG. 2 illustrates a generalized process diagram 400 for creating a viewership profile of a viewer who has tuned to a program channel on a network device 10. In a first step 402, the promotion agent 310 of the promotion agent subsystem 300 embedded in the network device 10 creates an event log of the viewer's activities. The event log records the channel to which this set top box is tuned to, the time the channel was tuned in, and the time the it left the channel. In the described embodiment, the event is recorded only if the period between the time the viewer tuned in the channel and the time the viewer tuned away from the channel is greater than about five seconds. By logging events that have only been watched for a period greater than five seconds, the promotion agent is able to distinguish shows that are actually watched from channel "surfing" by the viewer.

After the promotion agent 310 has logged viewer activities for a period time, such as twenty four hours, the logged activities are transmitted through messages, in a state 404, to the life cycle manager server 250. The messages are transmitted through a messaging protocol for unicast transmission, such as TCP/IP.

It is important to note here, however, that the uploading of these messages does not occur simply at the whimsy of the promotion agent 310 in the network device. Rather, a specific protocol is used by the system whereby the routers 250 advertise their ability to accept messages from the network devices 10, and the end nodes only attempt to communicate with the data center in response to receiving such messages.

In a state 406, the life cycle manager receives the event log from the promotion agent 310. Also, in the state 406 a program schedule 260 is periodically transmitted to the life cycle manager server 250. Such program schedule data for broadcast network is typically available from commercial services.

After receiving the logged viewership activities and the program schedule 260, the life cycle manager server 250 correlates the data in the state 406. Here, the life cycle manager determines the viewer behavior associated with the network devices. The life cycle manager may for example, determine what programs were watched and the percentage of time each program was watched during its scheduled time slot.

The viewer behavior data generated by the life cycle manager server is matched with group profiles 270 provided by third parties, such as advertisers, to the life cycle manager server 250. These group profiles 270 may include age, gender, residence and other demographic data.

Subsequently, in a state 408, the matched viewership behavior data and group profiles 270 is used to select and then download a targeted promotion to the determined class of the viewer. In a state 410, this promotion is delivered to the network devices 10.

2.0 An Overview of Router Functionality

Before continuing with a discussion of the protocol used to effect the delivery of event log information from the network devices 10 to the life cycle manager in step 404, it is illustrative to consider the routers 250 in more detail.

As mentioned previously, messages are delivered to and from the data center and the network devices through the routers 250. Messages come in two flavors: application and control. The application messages deliver data content; control messages are used to co-ordinate delivery. Application messages can have one of two delivery methods: Datagram and Standard. Standard messages guarantee persistence via a receipt control message. A message receiver sends a receipt to the sender for one of these messages as soon as the receiver has guaranteed that the message persists somewhere upstream of the sending device. Receipting or persistence functions are not performed for datagrams.

Each router 250 generally implements a protocol as follows:
  It checks to see if the destination for a message is online.
  If the device is online, the router forwards the message to that device and waits for the recipient to receipt the message.
  If the recipient receipts the message within the time allotted, then the recipient has guaranteed that the message persists upstream of the router. The router then sends a receipt to the message's sender if required.
  If the recipient does not receipt the message, the router persists the message in the database. The router will periodically attempt to deliver the message until the message expires or until the recipient sends a receipt.
  If the network device is offline, the router persists the message in the database and attempts to bring the device online. The router will send the message to the destination device when it comes online and will attempt to deliver the message periodically until the message expires or until the recipient sends a receipt.

Figure 3A:
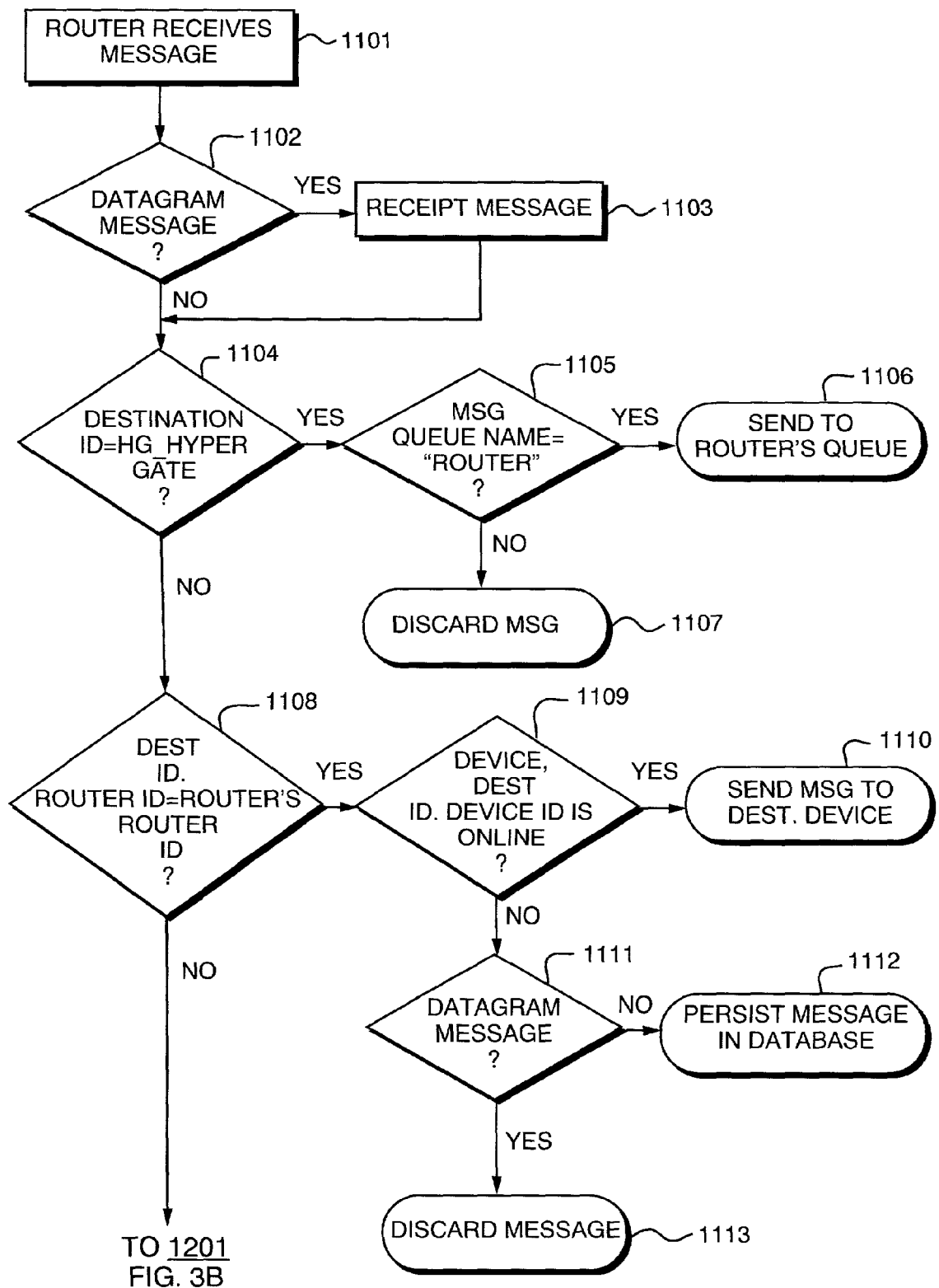
FIGS. 3A and 3B are a process flow diagram illustrating how a router processes different types of messages.
Figure 3B:
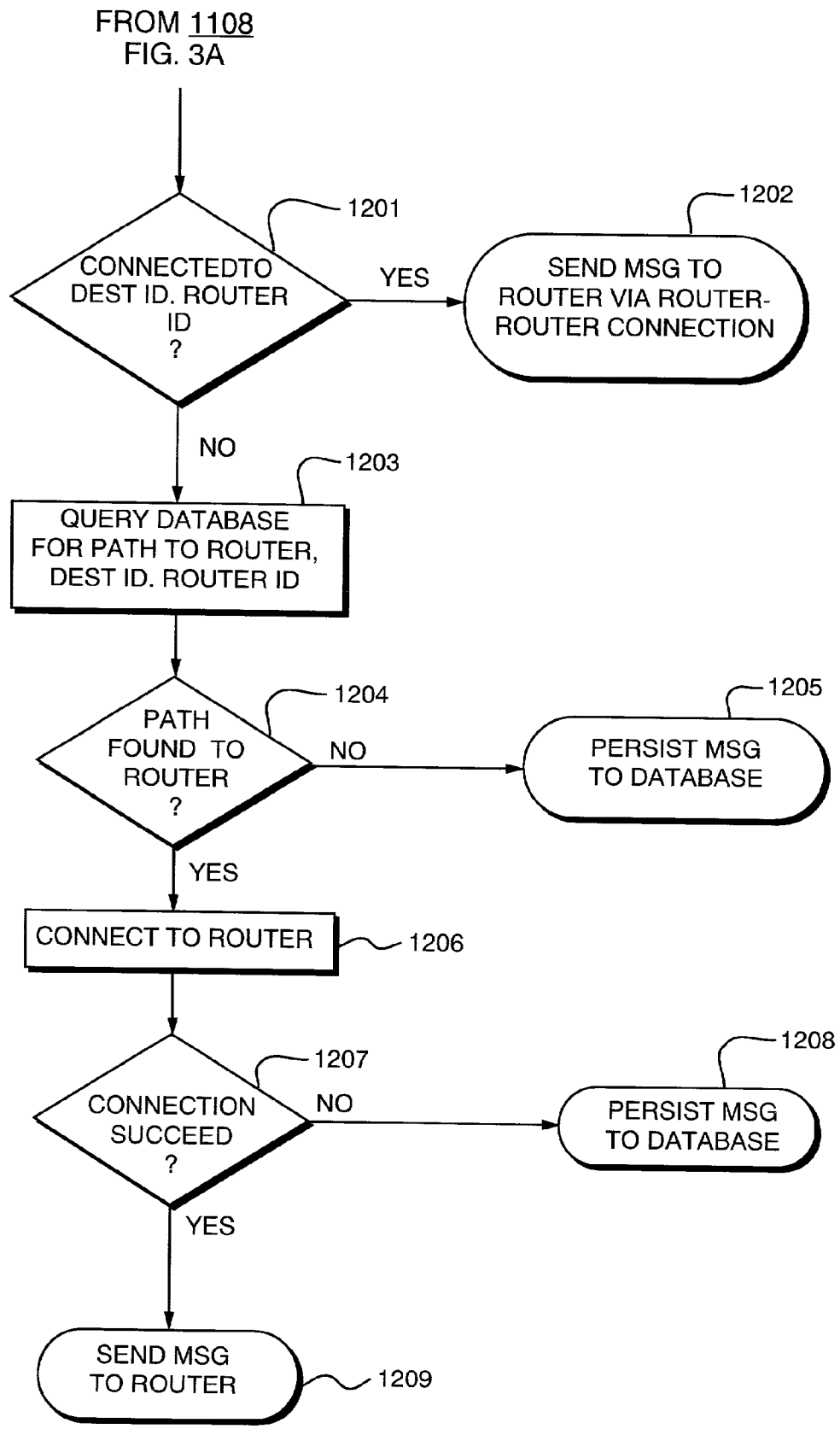

FIGS. 3A and 3B illustrate a generalized process flow diagram for the handling of messages by the routers 250.

In a first step 1101, a router 250 receives a message either from a device 10, from the database 210 or from another router 250 using a router-router protocol.

In step 1102, if a delivery method message parameter indicates that the message is to be sent as a datagram, i.e, indicates that the message should not be persisted if currently undeliverable.

In step 1103, the router sends a receipt control message to the sending entity (if the message is from a network device). The receipt object is sent back to the originating sender if using the router-router protocol.

In step 1104, the destination identifier in the message is examined. This will typically contain a network device identifier. However, one special case exists where the destination device ID=HG_HYPERGATE is used. This indicates a message to be sent to the components of router's internal machine itself, such as its message queue. The router chooses a recipient from its list of registered services and constructs the queue name and destination ID needed to route the message to that service.

In step 1105, a filter function is performed that removes improperly addressed router messages. The only acceptable value is "Router".

In step 1106, the message is handled as if sent to the router's queue via the internal router queue manager.

Step 1107 is reached if the message had an improper queue name, at which point the message is discarded.

Step 1108 is reached if the message did not have the internal router identifier. In this step, it is determined whether the router ID portion of the device specified in the destination ID matches the router's router ID.

Step 1109 checks to see if the device indicated by the device ID portion has a TCP connection to this router.

In step 1110, the message is sent to the device if connected.

Step 1111 checks to see if the router should discard a datagram sent to a device presumed to be offline Step 1112 persists standard messages to devices presumed to be offline. If the specified device is online with another router, that router will get the message via the database.

Step 1113 discards datagrams to offline devices.

Step 1201 is reached if the message is not intended for the router itself. First, the router checks to see if it is connected to the router indicated in the router ID portion of the device indicated in the message's destination ID.

In step 1202, if the device is connected, the router sends message to one of the other routers 250 presumed to be the path to the specified device (a device could switch routers during the period between message creation and message delivery).

At step 1203, if not connected, the router asks the database for the port and IP address on which to make a router-router connection to the destination device's router.

In step 1204, check the database's query for a path to the destination device's router.

In step 1205, if no such path exists, then persist message to database. If the device is online, its router will get the message from the database and deliver it.

In step 1206, a TCP connection is made to the destination device's router.

Step 1207 checks for a connection success or failure (due to timeout, network error, etc.).

In step 1208, the router persist the message to the database if the connection could not be established.

In step 1209, if the connection succeeded, the message is sent to the destination device's router via the router-router protocol.

2.1 Router to Router Extensions

Router to router protocol extensions are implemented to permit the routers 250 to communicate with each other. This protocol follows the same basic principle as router/device communication. A receipt by a router indicates that the message has persisted somewhere upstream. In general, all routers try to forward messages outside of the database, but some database method of persistence has to be available in case the end device is offline.

Router to router communication is different from device to router communication. In general, routers should always be online. Also, routers are a trusted entity within the system and have a less restricted network path to other routers. Router communication is tailored to these considerations. Routers are able to establish a privileged connection with other routers in order to forward messages.

This router-to-router protocol permits the routers to cooperate in order to coordinate the following tasks:

Device connection—the system provides centralization of device state within the database which maintains information as to which router on a head end connects to a particular network device 10. The routers 250 recognize the database information as correct and synchronized.

Message exchange—the system also provides a mechanism other than the database for forwarding messages from a service attached to one router to a device attached to a different router and vice-versa.

Message persistence—the system also provides a mechanism for persisting messages to offline devices.

Service location—the system has a mechanism that allows devices to send messages to a service without knowing, a priori, which machine hosts the service.

Router performance—the system is able to judge router load and maintains some indication as to whether the router is functioning properly.

2.2 Device Representation

Routers 250 in a multiple router system need to be able to associate a particular network device 10 with the routers that can connect or are connected to the device. This information is localized in a Global Unique Identifier (GUID) assigned to each network device 10. The use of a GUID permits the application level processes running on a router to identify destination devices without the need to maintain information as to the specific types of transport in use, or a device's network address. The device GUID hold two pieces of routing information, the network ID and the router ID. The network ID represents the set of routers that can connect to a given device. The router ID represents the particular router in a network that is currently connected to a device. Each router has a unique combination of network and router ID information.

Devices have a device ID that uniquely identifies them. Each device also has a network ID that identifies the sub-network head to which the device is connected. The network ID is not necessarily permanent, since head end configurations may change, but the network ID should persist with the same value for a long period of time. The network ID could also be a head end ID, but using network IDs accommodates a situation where multiple head ends are located in the same sub-network. Each connected device also has a router ID that identifies the router that is attached to it. Together, the device ID, network ID and router ID make up the device GUID, as shown in FIG. 4.

A service sending an unsolicited message to a device must get the device ID from some location; typically the database. A function is provided in the database that generates a device's device GUID given the device's device ID. Typically, stored procedures will use the device ID to join tables to the device table, but will write out the device GUID when assembling the final output. A device might not be online when the device GUID function is called. The device GUID function will specify a router ID if none is currently specified and will mark the device as eligible to go online if it is not currently online. The system anticipates that a request for a device GUID indicates that a message will soon be sent to it and tries to prepare the device appropriately. The device GUID function will contain load balancing logic. A device should be associated with the last router to service it, for consistency. A device should be associated with the router that has the least load. The device GUID will weigh these two considerations, reassigning a device if its former router is offline or is experiencing a load that degrades its performance significantly in comparison to other routers on the head end.

3.0 Router Database Tables and Procedures Detail

This section documents database tables and stored procedures used by the routers 250.

3.1 Router Database Tables

Table 1 is a database table T_NETWORK that describes a network. Examples of networks are the data center, the network that the Multiple System Operator (MSO) exposes for control of devices, and the Internet at large.

TABLE 1

T_NETWORK

| Column | Type | Meaning or value |
|---|---|---|
| ID | Number | Primary key for the network |
| NAME | String | User-readable, descriptive name for network |
| SECURE1 | Number | 0 - network is open to the Internet on Navic's ports. 1 - network is open to MSO's devices 2 - network traffic limited to the data center on Navic's ports. |
| KBITS_PER_SECOND | Number | # of kilobits that can be transmitted over the network per second (currently not used) |
| MULTICAST_TTL | NUMBER | # of router hops for multicast transmissions over network |
| BROADCAST_TTL | NUMBER | # of router hops for broadcast transmissions over network |
| NET_MASK | NUMBER | IP mask for network's address space |
| MC_AVAILABILITY_ADDRESS | NUMBER | IP address to use to multicast router availability |
| MC_AVAILABILITY_PORT | NUMBER | Port to use to multicast router availability |
| LISTENING_ROUTER_ID (fk of T_ROUTER.ID) | NUMBER | Router that's currently listening for device connect requests |
| MC_AVAILABILITY_FREQUENCY | NUMBER | # of (fractional) days between multicast availability transmissions. |

Table 2, T_ROUTER, represents a router servicing devices or a service that makes connections to the router via the router-router connection.

TABLE 2

T_ROUTER

| Column | Type | Meaning or value |
|---|---|---|
| ID | NUMBER | Primary key |
| WATCHDOG_TIME | Date | Last time router registered using SP_HGS_WATCHDOG |
| LOAD_METRIC | Number | Metric indicating router's load - higher indicates router is stressed. |
| STATE | Number | Router state - STATUS_OFFLINE - router is offline. STATUS_ONLINE - router is processing messages and connections. STATUS_ONLINE_DISCONNECT - router has not met its watchdog time and has been marked to be taken offline |

TABLE 2-continued

T_ROUTER

| Column | Type | Meaning or value |
|---|---|---|
| DNS_NAME | String | Router's host name. |
| DEVICE_ID (fk of T_DEVICE) | Number | A device ID that can be used to talk to the queue manager on the router's machine. |
| SERVICE_TYPE | Number | 0 - a router other - service type of a service connecting via the router-router connection |

Note in particular from the above that each router periodically determines a relative load metric and stores this information in the LOAD_METRIC entry in the table. In the preferred embodiment, a lower number indicates a better performing router. As will be understood shortly, the LOAD_METRIC entry is used by the router to determine how often to send an availability message to the network devices 10.

T_ROUTER_NIC, Table 3, represents a network card in a router. Typically, a router will have a network card with an IP address in the data center's firewalled network and one or more cards with IP addresses in an MSO's network.

TABLE 3

T_ROUTER_NIC

| Column | Type | Meaning or value |
|---|---|---|
| NIC_INDEX | Number | Zero-based index of the network interface card in the router's IP address table. |
| ROUTER_ID (fk of T_ROUTER.ID) | Number | Router ID of router in question |
| NETWORK_ID (fk of T_NETWORK.ID) | Number | The ID of the network to which the card is attached. |
| IP_ADDRESS | Number | The bind address to be used by IP to talk to the card |
| DEVICE_PORT | Number | The port # to bind to listen for connect requests from devices |
| ROUTER_PORT | Number | The port # to bind to listen for TCP connect requests from other routers |

Table 4, T_ROUTER_NIC_IN, is populated on initialization. It tells the stored procedure, PKG_HGS_ROUTER. SP_HGS_INIT, what network cards exist on the router.

TABLE 4

T_ROUTER_NIC_IN

| Column | Type | Meaning or value |
|---|---|---|
| TRANSACTION_GUID | RAW(16) | All rows specific for a particular invocation of SP_HGS_INIT are identified by the router by this GUID. |
| NIC_INDEX | Number | The zero-based network card index of the card associated with this row. |
| ROUTER_ID | Number | The ID of the router hosting the network card |
| IP_ADDRESS | Number | The IP address to use when binding to this card. |

Table 5, T_ROUTER_TUNING, contains one row that maintains the router tuning parameters used in the database. These parameters are used in the stored procedures.

TABLE 5

T_ROUTER_TUNING

| Column | Type | Meaning or value |
|---|---|---|
| LOAD_METRIC_THRESHOLD | Number | SP_HGS_ONE_CONNECT_REQUEST will reassign devices connected to routers whose load metrics are above this threshold. |
| WATCHDOG_TIMEOUT | Number | Maximum allowable # of (fractional) days between calls to SP_HGS_WATCHDOG before a router is taken offline (a router must call SP_HGS_WATCHDOG at least this often or it will be taken offline) |
| MSG_SEND_TIMEOUT | Number | Number of (fractional) days before a message is resent to a device that's online, but hasn't responded to a previous message send. |
| MSG_CONNECT_TIMEOUT | Number | Measured in (fractional) days. The router will bring a device online if it receives a message for the device and if it was able to bring the device online last time. If the router failed to bring the device online on the previous attempt, it will not attempt again unless the attempt was MSG_CONNECT_TIMEOUT days ago. |
| CONNECT_TIMEOUT | Number | Measured in (fractional ~ 15 minutes) days. The router reconnects if it receives a connect request for an online device if the connection was established more than CONNECT_TIMEOUT days ago. |
| CONNECT_REQUEST_TIMEOUT | Number | Measured in (fractional ~ 30 sec.) days. The router will ignore a second connect request if it was recorded within CONNECT_REQUEST_TIMEOUT days of a previous one. |

Table 6, T_SERVICE_TYPE, identifies a particular type of service supported through the router-router connection.

TABLE 6

T_SERVICE_TYPE

| Column | Type | Meaning or value |
|---|---|---|
| ID | Number | The service ID - this is the same as HG_PROP_SERVICE_TYPE in a message. |
| DESCRIPTION | String | User-readable description of the service |

Table 7, T_DEVICE, represents a device hosting a queue manager. T_DEVICE contains information used by several different entities. The columns listed here are the only ones used by the router and its stored procedures.

TABLE 7

T_DEVICE

| Column | Type | Meaning or value |
|---|---|---|
| ID | Number | Primary key - the device ID |
| CONNECT_STATE | Number | Enumeration of possible device connection states: STATUS_OFFLINE - device is not connected to a router STATUS_CONNECTING - a router is attempting to connect to the device STATUS_OFFLINE_CREQUEST - device or other entity has requested that the device be brought online. |

TABLE 7-continued

T_DEVICE

| Column | Type | Meaning or value |
|---|---|---|
| | | STATUS_ONLINE_CREQUEST - the router thinks that the device is online (stale TCP connection). The device has sent a connection request indicating it wants to re-establish a connection. STATUS_ONLINE - the device is online and can send and receive messages STATUS_DISCONNECTING_CREQUEST - the router is attempting to shut the device's stale socket before re-establishing the connection. |
| ADDRESS | Number | The device's last known IP address |
| PORT | Number | The device listens for connections from the router on this port. |
| LAST_CONNECT_TIME | Date | Last time the router successfully connected to the device. |
| LAST_CONNECT_ATTEMPT | Date | Last time the router tried to connect to the device. |
| MAC_ADDRESS2 | Number | The MAC address of the network card in the device. |
| CONNECT_OID | Number | This is a sequence # that is used to correlate an update of the connect parameters with any subsequent updates or selects |
| DEVICE_GUID | RAW(16) | The computed device GUID. The GUID contains the network ID, security, router ID (of the connecting router) and device ID. |
| NETWORK_ID | Number | The network used to connect to the device |
| ROUTER_ID | Number | The router currently in charge of connecting to the device. |

Table 8, T_CONNECT_REQUEST_IN is used by the router to transmit a set of connect requests to the database via PKG_HGS_CONNECT.SP_HGS_CONNECT_REQUEST.

TABLE 8

T_CONNECT_REQUEST_IN

| Column | Type | Meaning or value |
|---|---|---|
| TRANSACTION_GUID | RAW(16) | All rows specific for a particular invocation of SP_HGS_CONNECT_REQUEST are identified by the router by this GUID. |
| MAC_ADDRESS | Number | The MAC address of the connecting device (can be NULL) |
| IP_ADDRESS | Number | The IP address of the listener socket on the device |
| PORT | Number | The port number of the listener socket |
| NETWORK_ID | Number | The network ID of the network used to transmit the connect request |
| DEVICE_ID | Number | The device ID of the device making the connect request (can be NULL) |

Table 9, T_HGS_CONNECT_ACTIVITY_IN, is used by the router to inform the database of the set of devices whose connect states have changed. The router populates this table and calls PKG_HGS_CONNECTION.SP_HGS_CONNECT_ACTIVITY to process the inserted rows.

TABLE 9

T_HGS_CONNECT_ACTIVITY_IN

| Column | Type | Meaning or value |
|---|---|---|
| TRANSACTION_GUID | RAW(16) | All rows specific for a particular invocation of SP_HGS_CONNECT_ACTIVITY are identified by the router by this GUID. |
| DEVICE_ID | Number | The device ID of the connected or disconnected device |
| STATE | Number | Either STATUS_ONLINE or STATUS_OFFLINE - indicates the new device state. |
| ROUTER_ID | Number | ID of the router previously connected to the device |

Table 10, T_MESSAGE, contains the routing and delivery information for a message.

TABLE 10

T_MESSAGE

| Column | Type | Meaning or value |
|---|---|---|
| ID | Number | Primary key |
| GUID | RAW(16) | This is the message ID and is needed for correlating the message with receipts. |
| SEND_STATE | Number | STATUS_NOT_SENT - message has never been sent<br>STATUS_SEND_IN_PROGRESS - the router is attempting to send the message.<br>STATUS_SEND_FAILED - the router failed to send the message |
| OID | Number | This is used to correlate changes in the send state with subsequent selects (in case another procedure updates the send state in the meantime) |
| DESTINATION_DEVICE_ID | Number | The device ID of the device to receive the message |
| TIME_EXPIRED | Date | The time at which the message will expire - it should not be delivered after this date and can be deleted. |
| TIME_SENT | Date | The time at which the last send was attempted. |

Table 11, T_PAYLOAD, is a database entry which contains a portion of a message. The router breaks a message into 256 byte chunks in order to optimize use of space when uploading messages. A given message has one T_MESSAGE row and usually 1-3, but sometimes up to 20 rows in the T_PAYLOAD table.

TABLE 11

T_PAYLOAD

| Column | Type | Meaning or value |
|---|---|---|
| ID (fk of T_MESSAGE.ID) | Number | Indicates the message associated with this payload |
| ITEM_INDEX | Number | Zero-based index of the payload chunk. This is used to order the chunks when reassembling them. |
| DATA | RAW(256) | The data in the chunk |

Table 12, T_MESSAGE_ACTIVITY_IN is used by the router to inform the database of messages sent and not sent. The router creates a transaction GUID and puts it in each row of T_MESSAGE_ACTIVITY_IN, then calls PKG_HGS_MESSAGE.SP_HGS_RECORD_MESSAGE_ACTIVITY to process the results.

TABLE 12

T_MESSAGE_ACTIVITY_IN

| Column | Type | Meaning or value |
|---|---|---|
| TRANSACTION_GUID | RAW(16) | All rows specific for a particular invocation of SP_HGS_RECORD_MESSAGE_ACTIVITY are identified by the router by this GUID. |
| MESSAGE_GUID | RAW(16) | The message ID (HG_PROP_MESSAGE_ID) for the message |
| WAS_SENT | Number | Non-zero if sent, zero if not sent |

3.2 Router Stored Procedures

The router's stored procedures are contained in three packages,

PKG_HGS_ROUTER—for configuring the router and bringing it online.

PKG_HGS_CONNECTION—for processing device connections to a router.

PKG_HGS_MESSAGE—for processing messages to a device.

3.2.1 Router Online and Offline States

Figure 5:
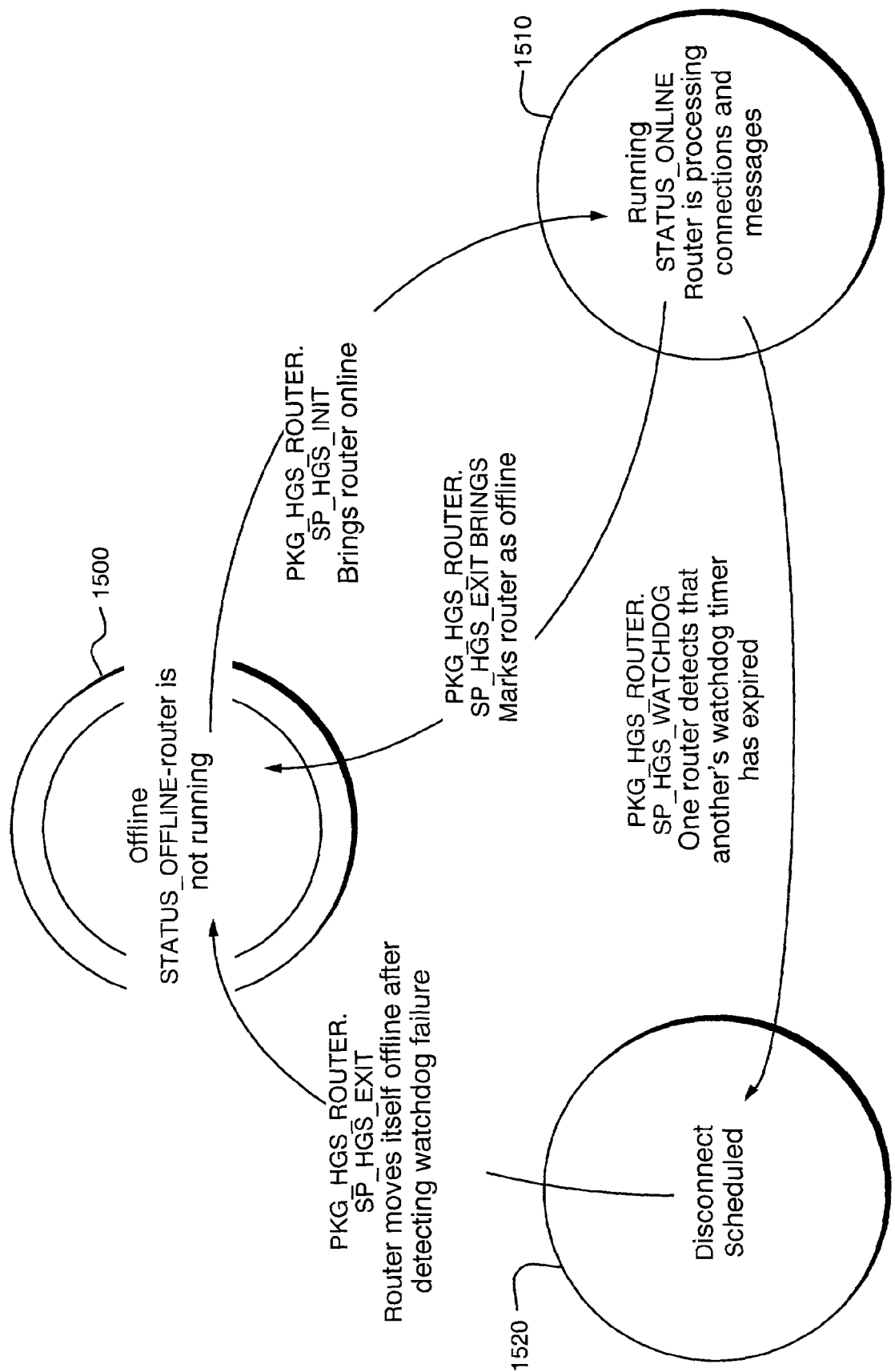
FIG. 5 is a high level router state diagram.

PKG_HGS_ROUTER contains the stored procedures that bring a router online, that take the router offline, that reset the watchdog timer, and that find other routers. A generalized router state diagram for these procedures is illustrated in FIG. 5. The states of the router device include an offline state 1500, a running state 1510, and a disconnect scheduled state 1520. The PKG_HGS_ROUTER software package contains these and other stored procedures. For example:

SP_HGS_INIT—The router calls this stored procedure when it comes online.

The procedure has five purposes:

To create a new entry in T_ROUTER for routers that are connecting for the first time.

To initialize device states (if a network has only one router and the router terminates without calling SP_

HGS_EXIT, device connect states may hold the erroneous STATUS_ONLINE at the time SP_HGS_INIT is called.

To mark the router as online.

To create new entries in the T_ROUTER_NIC table for new network cards.

To record the current IP addresses of the router's network cards.

To return the configuration information for the router's network cards.

A router creates one row in the T_ROUTER_NIC_IN table for each of its network cards. All rows should contain the same transaction GUID. This GUID is passed into SP_HGS_INIT to update its T_ROUTER_NIC table.

The following are the parameters for calls to SPS_HGS_INIT:

| Column | Type | Meaning or value |
|---|---|---|
| PKG_UGS_ROUTER.SP_HGS_INIT | | |
| TRANSACTION_ID_PARAM | RAW (in) | All rows of T_ROUTER_NIC_IN specific for a particular invocation of SP_HGS_NIT are identified by the router by this GUID. |
| HOST_NAME_PARAM | String (in) | The DNS host name for the calling router |
| MAC_ADDRESS_PARAM | Number (in) | The MAC address of the network card used by the router's queue manager-this is used to find the router's device ID in T_DEVICE. |
| ROUTER_ID_PARAM | Number (out) | The router's ID. (T_ROUTER.ID) |
| TIME_PARAM | Date (out) | The database's notion of the current time. |
| CURS_ROUTER_NIC_PARAM | Cursor (out) | This cursor contains one row per network card: the cursor contains the configuration information for that card. |
| CURS ROUTER NIC PARAM schema | | |
| NIC_INDEX | Number | Zero-based index of the network card. |
| NETWORK_ID (fk of T_NETWORK.ID) | Number | The network card is on this network. |
| IP_ADDRESS | Number | The router should use this IP address to bind to the network card. |
| DEVICE_PORT | Number | The router should listen for connect requests on this port (may be NULL if no listener is configured on this card) |
| ROUTER_PORT | Number | The router should listen for connections from other routers on this port (may be NULL if no listener is configured on this card. Should be NULL in general if card is not connected to the data center network). |
| MC_AVAILABILITY_ADDRESS | Number | The multicast address to be used to transmit the router availability multicast (can be NULL) |

-continued

Parameter List 1.

| Column | Type | Meaning or value |
|---|---|---|
| MC_AVAILABILITY_PORT | Number | The multicast port to be used to transmit the router availability multicast (can be NULL) |
| MC_AVAILABITY_FREQUENCY | Number | # of (fractional) days between router availability multicasts (can be NULL) |

SP_HGS_WATCHDOG—this stored procedure has several different functions:

It records the fact that the router is still active.

It updates the router's load metric and adjusts network card configuration based on this metric.

It takes routers that are inactive (e.g. because they terminated unexpectedly, were isolated from the database, were deadlocked) offline. This also marks all devices assigned to the inactive router as offline.

It transmits the router's network card configuration, allowing the router to update any changes.

The stored procedure has the following parameters:

| Parameter | Type | Meaning or value |
|---|---|---|
| Parameter List 2. PKG_HGS_ROUTER.SP_HGS_WATCHDOG | | |
| ROUTER_ID_PARAM | Number (in) | The ID of the calling router (T_ROUTER.ID) |
| LOAD_METRIC_PARAM | Number (in) | This is a calculated metric based on the router's performance. Higher numbers indicate that a router is more heavily loaded. |
| GO_OFFLINE_PARAM | Number (out) | The router should bring itself offline if this parameter is non-zero upon return. |
| TIME_PARAM | Date (out) | The database's notion of the current time |
| CURS_ROUTER_NIC_PARAM | Cursor (out) | This is the same as that in SP_HGS_INIT |

Note in particular from the above that each router periodically determines a relative load metric and stores this information in the LOAD_METRIC. In the preferred embodiment, a lower number indicates a better performing router. As will be understood shortly, the LOAD_METRIC entry is used by the router to determine how often to send an availability message to the network devices 10.

SP_HGS_EXIT—this stored procedure is called as its last database communication before terminating. It has the following functions:

It marks the router as offline.

It sets the device connect state of any devices connected to the router as offline.

SP_HGS_EXIT has the following parameters:

| Parameter List 3. PKG_HGS_ROUTER.SP_HGS_EXIT | | |
|---|---|---|
| Parameter | Type | Meaning or value |
| ROUTER_ID_PARAM | Number | The router going offline (T_ROUTER.ID) |

SP_HGS_FIND_PATH—this stored procedure finds the possible paths between two routers. It has the following parameters:

| Parameter List 4. PKG_HGS_ROUTER.SP_HGS_FIND_PATH | | |
|---|---|---|
| Parameter | Type | Meaning or value |
| SRC_ROUTER_ID_PARAM | Number (in) | The router ID of the calling router (T_ROUTER.ID) |
| DEST_ROUTER_ID_PARAM | Number (in) | The router to connect via the router-router protocol (T_ROUTER.ID) |
| CURS_PATH_PARAM | Cursor (out) | This cursor contains rows describing how to connect to the destination router. Each row describes a possible path. |

| Parameter List 5. CURS_PATH_PARAM schema | | |
|---|---|---|
| Column | Type | Meaning or value |
| BIND_ADDRESS | Number | The IP address to be used to bind to a network card in the router |
| IP_ADDRESS | Number | The IP address of a network card on the destination router |
| PORT | Number | The port # used by the destination to bind a router-router listener. The calling router should connect to this port. |
| NETWORK_ID | Number | The ID (T_NETWORK.ID) of the network used to connect the two routers. |
| SECURE | Number | The security level (T_NETWORK.SECURE) of the above network. |

3.2.2 Router Handling of Connection Requests

Figure 6:
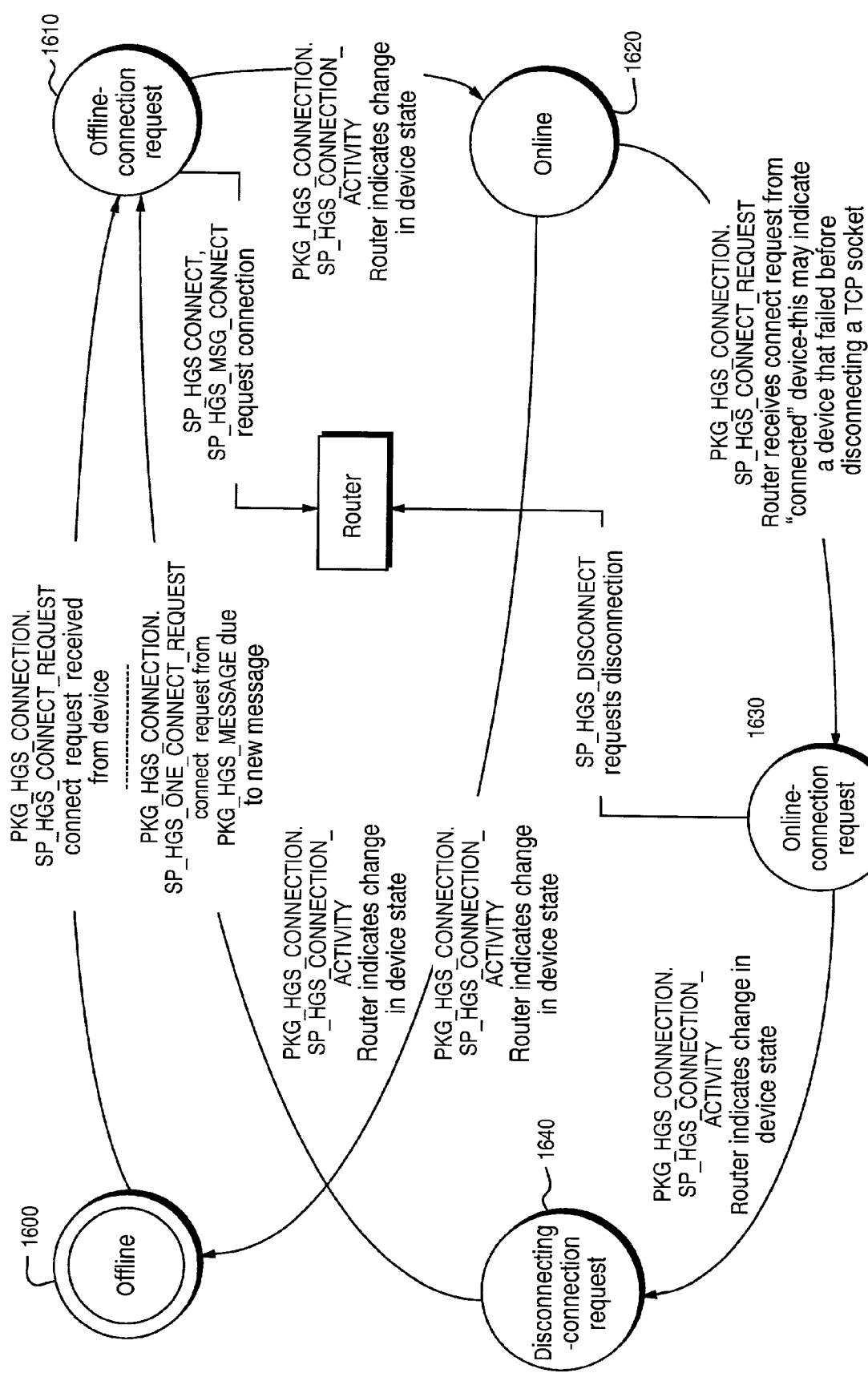
FIG. 6 is a high level state diagram for how a router handles network device connections.

The routers also of course handle connection requests from the network devices 10. A state diagram for this process is shown in FIG. 6. Generally, a state 1600 is an offline state, state 1610 is entered when a connection request is received in the offline state, state 1620 is an online state, state 1630 is an online connection request state, and state 1640 is entered when the router is disconnecting and receives a connection request.

The procedures called to implement these states are now discussed. PKG_HGS_CONNECTION contains the stored procedures to record connection requests from devices, to inform routers of devices requiring connection and to record the connection state of these devices. PKG_HGS_CONNECTION has the following stored procedures that are called from the C++ router:

SP_HGS_CONNECT_REQUEST—used by the router to transmit the set of devices issuing connect requests.

SP_HGS_CONNECTION_ACTIVITY—used by the router to transmit the set of devices whose connect states has changed.

SP_HGS_CONNECT—returns the set of devices requiring connection because of connect requests.

SP_HGS_MSG_CONNECT—returns the set of devices requiring connection because of messages pending.

SP_HGS_DISCONNECT—returns the set of devices requiring disconnection from stale connections.

PKG_HGS_CONNECTION also contains a stored procedure, SP_HGS_ONE_CONNECT_REQUEST, that may be called externally by other stored procedures to bring a device online. This may be done to prepare the device to receive messages from a service.

SP_HGS_CONNECT_REQUEST—This stored procedure records connection requests from devices. Devices send their IP address and listener port when they have messages to send to a router. The stored procedure records these in the database. The router creates rows in the T_CONNECT_REQUEST_IN table, then calls SP_HGS_CONNECT_REQUEST to process the requests.

SP_HGS_CONNECT_REQUEST has the following functions:

It creates a new row in the T_DEVICE table for unassigned devices. SP_HGS_CONNECT_REQUEST will do this for devices which do not transmit a MAC address or device ID (indicating that they don't know either quantity) or that transmit MAC addresses or device Ids that aren't in the T_DEVICE table.

It updates the IP address and port # in each device's T_DEVICE row.

It assigns a router and device GUID to a device based on router load and the connecting network.

SP_HGS_CONNECT_REQUEST has the following parameters:

| Parameter List 6. PKG_HGS_CONNECTION.SP_HGS_CONNECT_REQUEST | | |
|---|---|---|
| Parameter | Type | Meaning or value |
| TRANSACTION_GUID | RAW(16) | This selects rows from the T_CONNECT_REQUEST_IN table. The stored procedure processes, then deletes these rows. |

SP_HGS_CONNECT. The router calls this stored procedure to get the set of devices requiring connection because of connection requests. This includes connection requests from SP_HGS_CONNECT_REQUEST and those due to messages being sent to offline devices. These are cases requiring relatively immediate response. SP_HGS_CONNECT returns a cursor containing the information needed to connect. The procedure has the following parameters:

| Parameter List 7. PKG_HGS_CONNECTION.SP_HGS_CONNECT | | |
| --- | --- | --- |
| Parameter | Type | Meaning or value |
| ROUTER_ID_PARAM | Number | The router ID of the router requesting device connection information. |
| CURS_HGS_CONNECT_PARAM | Cursor | This cursor contains one row per device needing connection. |

| Parameter List 8. CURS_HGS_CONNECT_PARAM schema | | |
| --- | --- | --- |
| Column | Type | Meaning or value |
| DEVICE_GUID | RAW(16) | The device GUID of the device requiring connection (T_DEVICE.DEVICE_GUID) |
| NETWORK_ID | Number | The router should connect to the device though a port bound to a card attached to this network. |
| IP_ADDRESS | Number | The IP address to connect to (the device's listener socket is bound to this address) |
| PORT | Number | The port # of the device's listener. |

SP_HGS_MSG_CONNECT—this stored procedure returns the set of connections to be made to devices with messages pending. This call should be made less frequently than SP_HGS_CONNECT (and, if possible, with lower priority) because it is relatively expensive compared to SP_HGS_CONNECT and because the connections do not need to be made in a timely fashion. SP_HGS_MSG_CONNECT has the same parameter signature as SP_HGS_CONNECT.

SP_HGS_DISCONNECT—this stored procedure returns the set of stale device connections. The router should attempt to disconnect from these devices. SP_HGS_DISCONNECT has the same parameter signature as SP_HGS_CONNECT.

SP_HGS_CONNECT_ACTIVITY—the router updates the connection state in T_DEVICE using this stored procedure. The router inserts rows into T_HGS_CONNECT_ACTIVITY_IN. Each row contains a transaction GUID which correlates the row with the particular invocation of SP_HGS_CONNECT_ACTIVITY. SP_HGS_CONNECT_ACTIVITY updates T_DEVICE.CONNECT_STATE for each row processed, deletes the row and sends a result code in CURS_ACTIVITY_PARAM which is returned from the stored procedure.

| Parameter List 9. PKG_HGS_CONNECTION.SP_HGS_CONNECT_ACTIVITY | | |
| --- | --- | --- |
| Parameter | Type | Meaning or value |
| TRANSACTION_ID_IN | RAW(16) | All rows in T_HGS_CONNECT_ACTIVITY_IN are identified by the router by this GUID. |
| CURS_ACTIVITY_PARAM | Cursor | The procedure returns one row per row in T_HGS_CONNECT_ACTIVITY_IN to indicate success or failure of the operation. |

| Parameter List 10. CURS_ACTIVITY_PARAM schema | | |
| --- | --- | --- |
| Column | Type | Meaning or value |
| DEVICE_ID | Number | The ID (T_DEVICE.ID) of the device whose state has changed |
| RESULT | Number | ERROR_NONE (=0) if the row was properly formed, ERROR_NO_SUCH_DEVICE (=1) if the device ID did not match any in the T_DEVICE table. ERROR_BAD_STATE if T_HGS_CONNECT_ACTIVITY_IN. STATE was not STATUS_ONLINE or STATUS_OFFLINE |

SP_HGS_ONE_CONNECT_REQUEST—this stored procedure makes a connect request on behalf of some other stored procedure. It operates similarly to SP_HGS_CONNECT_REQUEST (in fact it provides the implementation for SP_HGS_CONNECT_REQUEST in the current, but not subsequent, code base). It has the following parameters:

Parameter List 11.
PKG_HGS_CONNECTION.SP_HGS_ONE_CONNECT_REQUEST

| Column | Type | Meaning or value |
| --- | --- | --- |
| DEVICE_ID_PARAM | Number | The device requiring connection (T_DEVICE.ID) (may be NULL) |
| MAC_ADDRESS_PARAM | Number | The MAC address of the device requiring connection (may be NULL) |
| ADDRESS_PARAM | Number | IP address of the device requiring connection (may be NULL if device ID or MAC address correctly specified) |
| PORT_PARAM | Number | Listener port # (may be NULL, see ADDRESS_PARAM) |
| NETWORK_ID_PARAM | Number | Network ID to be used to communicate to above address (may be NULL, see ADDRESS_PARAM) |

3.3.3 Router Messaging States

Figure 7:
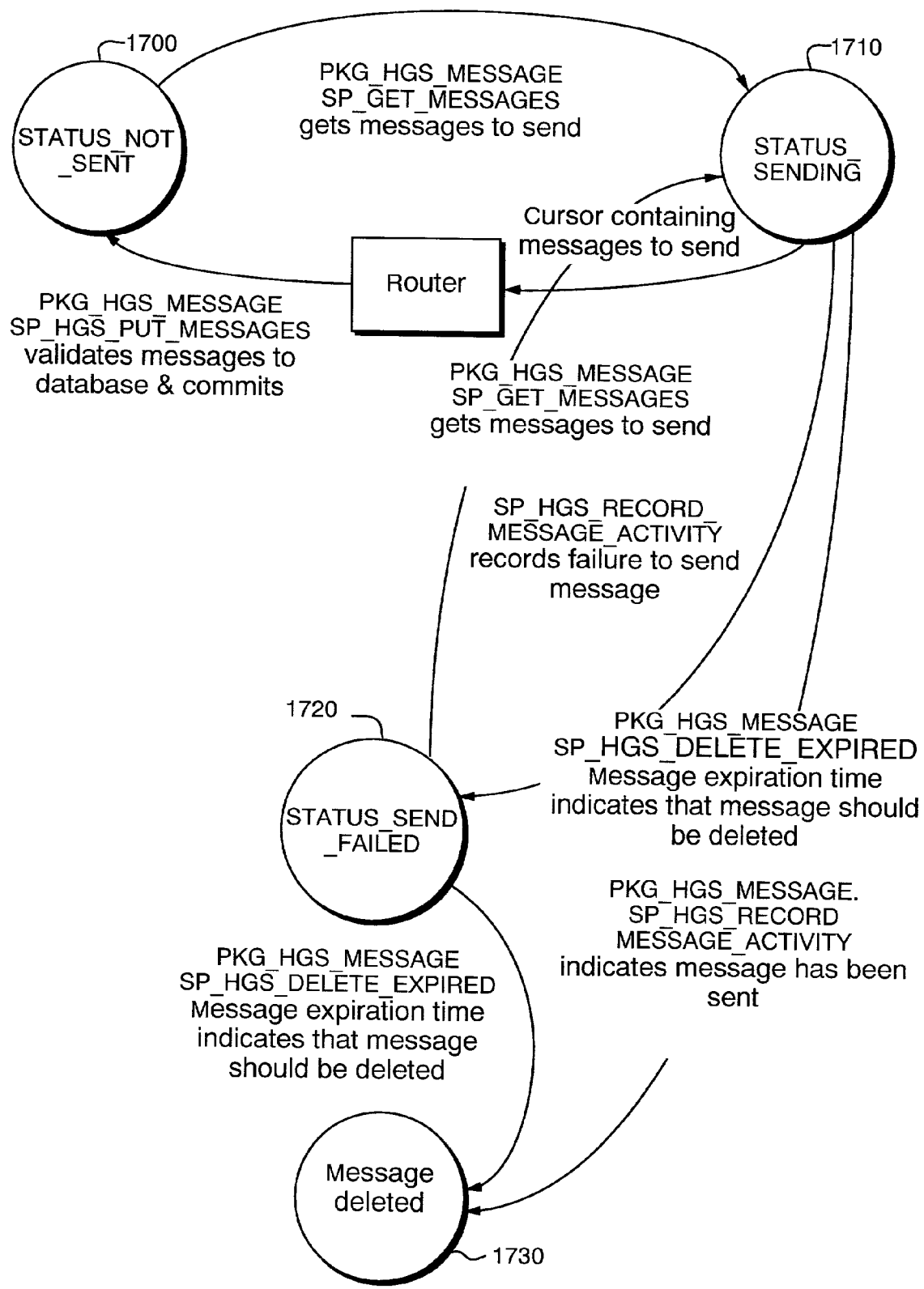
FIG. 7 is a high level message state diagram.

Once connections are made, the routers 250 of course also handle the processing of messages. This process is shown generally in FIG. 7, and includes a status not sent state 1700, a status sending state 1710, a status failed sending state 1720, and a status message deleted state 1730.

The stored procedure PKG_HGS_MESSAGE contains the program code stored on a non-transitory computer readable medium that verify incoming messages, that pick messages eligible for transmission, that update state, and that delete messages. The following messages are intended for external access:

SP_HGS_PUT_MESSAGES—this procedure verifies the destination address of messages and commits the insert transaction.

SP_HGS_GET_MESSAGES—this procedure gets a cursor of payloads of messages to be sent from a particular router to connected devices.

SP_HGS_RECORD_MESSAGE_ACTIVITY—this procedure reports the results of attempts to send the messages retrieved by SP_HGS_GET_MESSAGES SP_HGS_DELETE_EXPIRED—this procedure deletes messages that have expired. It should be run from a job within Oracle.

Both SP_HGS_GET_MESSAGES and SP_HGS_RECORD_MESSAGE_ACTIVITY update T_MESSAGE.SEND_STATE. Each of them updates T_MESSAGE.OID whenever it updates T_MESSAGE.SEND_STATE. This allows each stored procedure to exclude rows modified between selection via cursor and update.

SP_HGS_PUT_MESSAGES—the router creates a row in the T_MESSAGE and multiple rows in the T_PAYLOAD table for each message persisted to the database. It uses a unique OID to mark all of these messages and unique IDs to mark each individual message and its payloads. SP_HGS_PUT_MESSAGES validates the destination device IDs—these are created by C++ applications and may be invalid. It deletes any invalid messages and commits the rest.

Parameter List 12.
PKG_HGS_MESSAGE.SP_HGS_PUT_MESSAGES

| Parameter | Type | Meaning or value |
| --- | --- | --- |
| OID_PARAM | Number | All messages to be processed are marked with this OID |

SP_HGS_GET_MESSAGES—the router retrieves the set of messages to process via this stored procedure. The stored procedure returns a cursor of payloads; these payloads are ordered by message ID and then by payload item index. SP_HGS_GET_MESSAGES changes the message state to STATUS_SEND_IN_PROGRESS for outgoing messages to prevent a resend. SP_HGS_GET_MESSAGES has the following parameters:

Parameter List 13.
PKG_HGS_CONNECTION.SP_HGS_GET_MESSAGES

| Parameter | Type | Meaning or value |
| --- | --- | --- |
| ROUTER_ID_PARAM | Number | Calling router's ID |
| CURS_PAYLOAD_REF_PARAM | Cursor | The payloads of the messages to be sent. |

Parameter List 14. CURS_PAYLOAD_REF_PARAM schema

| Column | Type | Meaning or value |
| --- | --- | --- |
| MESSAGE_GUID | RAW(16) | HG_PROP_MESSAGE_ID from the message - this is used to correlate messages, acks and receipts |
| DEVICE_GUID | RAW(16) | The GUID of the destination device |
| ITEM_INDEX | Number | The zero based index of the payload chunk. Each chunk but the last is 256 bytes long. They are combined to form a whole message. |
| DATA | RAW(256) | The payload data. |

SP_HGS_RECORD_MESSAGE_ACTIVITY—this stored procedure records the result of an attempt to send a message retrieved via SP_HGS_GET_MESSAGES. The router inserts rows into T_MESSAGE_ACTIVITY_IN indicating the results of a transfer attempt. It marks each row in this table with a transaction GUID which it passes into SP_HGS_RECORD_MESSAGE_ACTIVITY.

SP_HGS_RECORD_MESSAGE_ACTIVITY deletes any messages marked as sent and sets the send state of any unsent messages to STATUS_SEND_FAILED.

SP_HGS_RECORD_MESSAGE_ACTIVITY has the following parameters:

Parameter List 15.
PKG_HGS_MESSAGE.SP_HGS_RECORD_MESSAGE_ACTIVITY

| Column | Type | Meaning or value |
| --- | --- | --- |
| TRANSACTION_GUID | RAW(16) | All rows in T_MESSAGE_ACTIVITY_IN specific for a particular invocation are identified by the router by this GUID. |

4.0 Device Connection Protocol

Having now some basic appreciation for the various information maintained to effect message routing, the following mechanisms are used to allow network devices to send connection request messages in an attempt to communicate with the data center through the routers 250 in accordance with the invention.

Basically, there are three possible scenarios for a network device attempting to connect to a router, including broadcast requests, DNS (static IP) requests, and multicast type requests.

Broadcast: A device may broadcast its device connection packet in certain limited instances, such as if it is less than one network hop from a router.

DNS or static IP: A device may send a connection packet to a router known to be at a particular DNS or static IP address.

Multicast or broadcast availability: This is the most common case and the one to which the present invention is directed. A router announcer process multicasts or broadcasts a list of routers that can be sent connection requests. The multicast or broadcast takes place on a known IP address and port, using a UDP protocol. The payload portion of such a router announcement service UDP packet is shown in FIG. 8. The packet includes at least an identifier field 500 indicating the type of packet, e.g., that this is a router announcement packet. A field of 128 bits is allocated for the identifier field 500 in this embodiment.

In addition, a time field 510 indicating the time of the announcement, and a port number 520 for establishing a connection to the router, are also included. The time field 510 supports synchronization of events within the entire system as well as security functions. The port number provides the port used to address the packet to the router process. A separate network address for the router need not be specified in the payload portion of the packet, since this information can be gleaned from the UDP header information (not shown in FIG. 7).

The system allows provisioning for more than one router as equally preferred. For instance, if two routers are at a particular location, then they can each send availability messages. Devices would be as likely to receive one packet as the other. The preferred port number of the router announcer is 18505. The preferred port for connection requests on the router is 18503.

In response to receiving an announcer message, the network devices can then request that they be permitted to connect to the announcing router. This takes the form of a device connection UDP packet. The packet itself contains enough information to discern at least the requesting device's IP address.

There are three cases for the device connect messages, shown respectively in FIGS. 9A, 9B, and 9C.

In the first instance, shown in FIG. 9A, the network device does not know its device ID or MAC address. This can be used as an initial provisioning case for devices with inaccessible MAC addresses.

In a second instance, shown in FIG. 9B, the network device knows its MAC address. This is the preferred case as it allows the server to change the device's device ID.

In a third instance, shown in FIG. 9C, the device has cached its device ID from a previous call.

Regardless of the addressing format, the payload portion of the packet data provides the port number and device ID or MAC address for the device, as used by the router in establishing the connection to the requesting network device.

Finally, in response to receipt of one of these messages, a given one of the routers will respond by connecting to the network device 10. The router preferably sends a clock message as the first message to the device. The clock message contains the network device's assigned GUID in the message header field,. The device can then use this GUID as its sender identification for subsequent messages. The clock message can contain a device ID different from the one sent in the case where the MAC address is unknown. The device will persist the new device ID and use it in subsequent device connections While this invention has been particularly shown and described with references to preferred embodiments thereof, it will be understood by those skilled in the art that various changes in form and details may be made therein without departing from the scope of the invention encompassed by the appended claims.

What is claimed is:

1. In a network system that connects a central location to a large number of network devices, a method for controlling a number of messages originating at the network devices comprising the steps of:

advertising an available router connection for handling the messages at a router and at an application-level to a specific network device by announcing a network address of the router and a port number of the router for handling the messages, wherein the advertising of availability of the router connection is based on the loading of the router;

connecting the specific network device to the router for handling the messages using a connection request addressed to the network address of the router and the port number announced by the available router connection advertised, wherein the specific network device is connected to the router only after receiving the router connection availability announcement;

assigning a router ID of the router connected and a device Global Unique Identifier (GUID) to the specific network device in response to the connecting, the device GUID permits the router for handling the messages to identify the specific network device without using network address of the specific network device;

sending subsequent messages from the specific network device to the central location through the available router connection connected, the subsequent messages being identified by the device GUID; and as a function of the advertising of the available router connection to which the specific network device responds with the connection request, allowing a limited number of the messages to be originated at the specific network device;

wherein the messages are connection request messages originating from the network devices requesting that a connection be made to the central location; and wherein the device GUID includes the router ID of the router to which the specific network device is connected to, a network ID, and a device ID.

2. A method as in claim 1 wherein the advertising is repeated at a rate which depends upon a relative availability of a router connection to service the message.

3. A method as in claim 1 wherein the available router connection advertised indicates a time window within which the network device may respond with the connection request to connect to the router through the available router connection advertised.

4. A method as in claim 1 wherein the available router connection advertised is a UDP datagram.

5. A method as in claim 1 wherein the available router connection advertised is sent as a broadcast message.

6. A method as in claim 1 wherein the available router connection advertised is sent as a multicast message to a specific group of network devices.

7. A method as in claim 1 wherein the available router connection advertised represents a right for the network device to connect to the router for a limited time only.

8. A method as in claim 1 wherein subsequent payload messages include network device event logs.

9. A method as in claim 1 wherein the available router connection advertised is sent through multiple designated routers.

10. A computer router comprising a non-transitory computer readable medium storing computer usable program code for controlling a number of messages originating at network devices, the computer router including:

computer usable program code for advertising an available router connection of a router for handling the messages at a router and at an application-level to a specific network device by announcing a network address of the router and a port number of the router for handling the messages, wherein the advertising of availability of the router connection is based on the loading of the router;

computer usable program code for connecting the specific network device to the router for handling the messages using a connection request addressed to the network address of the router and the port number announced by the available router connection advertised, wherein the specific network device is connected to the router only after receiving the router connection availability announcement;

computer usable program code for assigning a router ID of the router connected and a device Global Unique Identifier (GUID) to the specific network device in response to the connecting, the device GUID permits the router for handling the messages to identify the specific network device without using a network address of the specific network device;

computer usable program code for sending subsequent messages from the specific network device to a central location through the available router connection connected, the subsequent messages being identified by the device GUID; and as a function of the computer usable program code for advertising the available router connection to which the specific network device responds with the connection request, allowing a limited number of the messages to be originated at the specific network device;

wherein the messages are connection request messages originating from the network devices requesting that a connection be made to the central location; and wherein the device GUID includes the router ID of the router to which the specific network device is connected to, a network ID, and a device ID.

* * * * *

UNITED STATES PATENT AND TRADEMARK OFFICE
CERTIFICATE OF CORRECTION

PATENT NO. : 7,653,743 B2 Page 1 of 1
APPLICATION NO. : 09/999718
DATED : January 26, 2010
INVENTOR(S) : Kamentsky et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

Signed and Sealed this

Twenty-third Day of November, 2010

David J. Kappos
*Director of the United States Patent and Trademark Office*